United States Patent

Lange et al.

[11] Patent Number: 5,182,432
[45] Date of Patent: Jan. 26, 1993

[54] CRACK DETECTOR AND HEATING CIRCUIT FOR MOTOR VEHICLE HEADLIGHT LIGHT TRANSMISSIVE SHIELD

[75] Inventors: Ulrich V. Lange, Erwitte; Wolfgang Daub, Lippstadt; Friedrich-Karl Wendt, Salzkotten, all of Fed. Rep. of Germany

[73] Assignee: Hella KG Hueck & Co., Lippstadt, Fed. Rep. of Germany

[21] Appl. No.: 698,958

[22] Filed: May 13, 1991

[30] Foreign Application Priority Data

May 14, 1990 [DE] Fed. Rep. of Germany ....... 4015399

[51] Int. Cl.$^5$ .................. H05B 41/29; H05B 1/02; F21M 7/00; B60S 1/56
[52] U.S. Cl. .................. 219/202; 219/203; 362/61; 340/655; 315/82; 315/116; 307/10.8
[58] Field of Search ......... 219/202, 203, 218; 362/92, 61; 313/15; 250/495.1; 307/10.8; 340/640, 655; 315/82, 115-116

[56] References Cited

U.S. PATENT DOCUMENTS

| Re. 33,343 | 9/1990 | Bitter et al. | 219/203 |
|---|---|---|---|
| 3,248,533 | 4/1966 | Mathis | 315/116 |
| 3,800,121 | 3/1974 | Dean et al. | 219/202 |
| 3,876,862 | 4/1975 | Newman et al. | 219/203 |
| 3,941,975 | 3/1976 | Newman et al. | 219/203 |
| 4,713,583 | 12/1987 | Hochstein | 315/82 |
| 4,808,799 | 2/1989 | Schave | 219/203 |
| 4,829,163 | 5/1989 | Rausch et al. | 219/203 |
| 4,847,472 | 7/1989 | Koontz | 219/203 |
| 4,891,563 | 1/1990 | Gauser et al. | 315/116 |
| 5,017,839 | 5/1991 | Arlt et al. | 315/219 |
| 5,086,212 | 2/1992 | Itakura et al. | 219/505 |
| 5,095,336 | 3/1992 | Corona et al. | 313/15 |

FOREIGN PATENT DOCUMENTS

| 0033633 | 8/1981 | European Pat. Off. |
| 1936149 | 1/1971 | Fed. Rep. of Germany . |
| 2419662 | 1/1975 | Fed. Rep. of Germany . |
| 2714781 | 5/1978 | Fed. Rep. of Germany . |
| 3232169A1 | 3/1984 | Fed. Rep. of Germany . |
| 148435 | 5/1981 | German Democratic Rep. . |
| 1560625 | 2/1980 | United Kingdom . |

Primary Examiner—Bruce A. Reynolds
Assistant Examiner—John A. Jeffery
Attorney, Agent, or Firm—Griffin, Butler, Whisenhunt & Kurtossy

[57] ABSTRACT

A circuit arrangement for a motor vehicle headlight including a reflector and/or a lens, a light source coupled to a voltage providing device (W), at least one electrically conductive heating element (H) mounted on or in an enclosing light-transmissive shield coupled to the voltage source, and a switching-on apparatus (E) for the heating element will, in addition to avoiding a coating and ice build-up, in an uncomplicated and cost effective manner provide a dependable, security-increasing, crack monitoring of the light transmissive shield in that the heating element is electrically coupled with an analyzing apparatus (A) which includes a light-transmissive-shield, crack-monitoring device formed as a current or voltage measuring device.

8 Claims, 1 Drawing Sheet

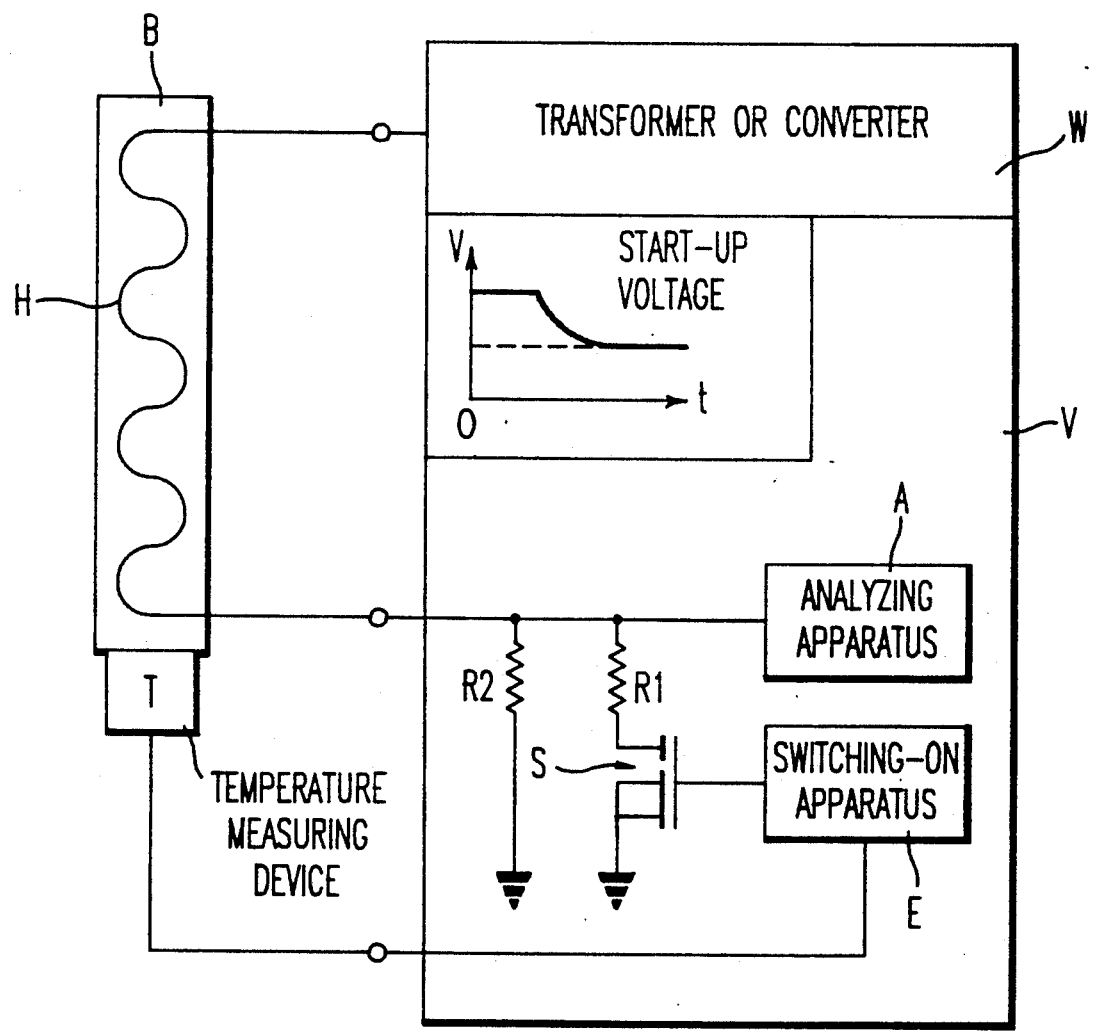

CRACK DETECTOR AND HEATING CIRCUIT FOR MOTOR VEHICLE HEADLIGHT LIGHT TRANSMISSIVE SHIELD

BACKGROUND OF THE INVENTION

This invention relates to a circuit arrangement for a motor vehicle headlight having a reflector and/or a lens, a light source coupled to a voltage providing apparatus (or source), an enclosing light-transmissive shield with at least one electrically conductive heating element thereon or therein, and a switching-on apparatus for the heating element.

Such a circuit arrangement for a motor vehicle of this type is known from German Auslegeschrift DE-AS 27 14 781. A motor vehicle headlight has a reflector and a light source which is coupled to a voltage providing circuit. An enclosing light-transmissive shield of the motor vehicle headlight has at least one electrically conductive heating element on or in the light-transmissive shield which is coupled to a switching-on apparatus.

In a headlight whose light source is not continuously on the enclosing light-transmissive shield has a tendency under particular temperature conditions to become coated or to get an ice build-up thereon. The electrical heating apparatus, which here is turned on dependent upon various turn-on conditions, has however a disadvantageous in that when there is a safety-endangering crack in the enclosing light-transmissive shield, such crack is not recognized.

It is an object of this invention to provide a circuit arrangement for a motor vehicle headlight with which, in addition to avoiding a coating and ice build-up in an uncomplicated and cost effective manner, also provides a dependable, safety-increasing, crack monitoring, or inspection, of the light-transmissive shield.

SUMMARY OF THE INVENTION

According to principles of this invention, the heating element is electrically coupled with an analyzing apparatus and the analyzing apparatus includes a light-transmissive shield crack monitoring device which is formed as a current measuring device or a voltage measuring device.

BRIEF DESCRIPTION OF THE DRAWING

The foregoing and other objects, features and advantages of the invention will be apparent from the following more particular description of a preferred embodiment of the invention, as illustrated in the accompanying drawing in which reference characters refer to the same parts. The drawing is not necessarily to scale, emphasis instead being placed upon illustrating principles of the invention in a clear manner.

The drawing is a partially-block, partially-schematic, diagram of a circuit arrangement of this invention including a light-transmissive shield.

DESCRIPTION OF A PREFERRED EMBODIMENT

The sole drawing discloses a circuit arrangement for a motor vehicle headlight, which motor vehicle headlight (not shown) has an enclosing light-transmissive shield B with at least one electrically conductive heating element H arranged in or on the light-transmissive shield B. Terminal wires of the heating element H, shown here for example as at least one heating coil, are electrically coupled with a voltage providing circuit which here, for example, is a main connecting device, or power supply unit, V of a (not shown) high pressure gas discharge lamp of the motor vehicle headlight. One of the terminal wires of the heating element H is thereby electrically coupled with a series transformer, or converter, W of the main connecting (or switching) device, or power supply unit, V while the other terminal wire of the heating element H is electrically coupled with an analyzing apparatus A as well as with a switching-on apparatus E. In another embodiment the switching-on apparatus E and the analyzing apparatus A can be combined in a single device. Additionally, the analyzing apparatus A and the switching-on apparatus E can be arranged to be separate from the main connecting device, or power supply unit, V of the high pressure gas discharge lamp.

A switching device S is here, for example, arranged at the connection between the switching-on apparatus E and the heating element H. The switching device S is here for example, shown as a transistor whose switching path, controlled by the switching-on apparatus E, can couple the heating element H with ground. The switching path of the switching device S is here via a first resistor R1 coupled to the analyzing apparatus A as well as to the heating element H.

The first resistor R1 is a measuring resistor from which a voltage is derived when the switching device S is closed. If the heating element H is broken, a second resistor R2, which couples ground with the heating element H as well as with the analyzing apparatus A, provides therefor that the voltage is reduced to a defined value. The input of the analyzing apparatus A is arranged to have a very high resistance.

The analyzing apparatus A monitors also the heating element H when the switching device S is open because the voltage at the input of the analyzing apparatus A is identical to the energizing voltage from the main connecting device, or power supply unit, V.

For a particularly energy saving embodiment of the circuit arrangement, the switching-on apparatus E can be combined with a temperature measuring device T so that the heating element H is provided with current only when temperatures are present which make possible coating and ice build-up. The enclosing light-transmissive shield B, which also can be formed as a diffuser in order to distribute light from the light source in predetermined areas, can be provided with a heating element that is formed as a conductive, light-transmissive, coating, or layer, mounted on the light-transmissive shield.

High pressure gas discharge lamps have a high efficiency so that dissipated power or energy is often not sufficient to prevent a coating- or ice-buildup or a continuous coating or continuous ice after commencement of operation. For this reason, when high pressure gas discharge lamps are used in motor vehicle headlights the use of an electrical heater on the light-transmissive shield is highly beneficial. Thereby it has proven to be particularly beneficial that during start-up of a high pressure gas discharge lamp, and during a time after start-up of the high pressure gas discharge lamp, as here, for example, for the main connecting device, or power supply unit V to provide an increased voltage indicated graphically in the drawing, from the series transformer or converter W to the heat element H by means of which a coating or ice on the light-transmissive shield is particularly quickly removed which improves safety upon start-up of a motor vehicle.

Because the analyzing apparatus A also has a crack monitoring device for the light-transmissive shield B, the particular advantage arises upon use of a high pressure gas discharge lamp in a motor vehicle that safety during operation of the motor vehicle is substantially increased because in the event of a crack, or break, of the light-transmissive shield B, high-voltage conducting parts of the motor vehicle headlight become accessible, which can lead to life threatening injuries. In the case of a crack of the light-transmissive shield, upon a dependable detection of the crack, the main connecting device, or power supply unit, V of the high pressure gas discharge lamp is switched to provide no further current.

It is beneficial that the heating element is electrically connected with an analyzing apparatus and that the analyzing apparatus includes a light-transmissive shield-crack-inspection apparatus which is in the form of a current measuring or voltage measuring device because in this manner, in a particularly uncomplicated and cost effective manner, in addition to avoiding coating and ice buildup, a crack monitoring of the light-transmissive shield is assured which operates with a high degree of dependability and increases safety of motor vehicle operation.

It has been shown to be particularly beneficial that the light source is a high pressure gas discharge lamp and that the voltage production apparatus is a main connecting device, or power supply unit, of the high pressure gas discharge lamp because in this manner it is not only assured that upon use of high pressure gas discharge lamps in motor vehicle headlights, which have a high degree of efficiency and thereby a small amount of power dissipation which, upon long operation, is not sufficient under particular temperature conditions to maintain the light-transmissive shield of the motor vehicle headlight coating and ice free, a coating and ice build-up is dependably avoided but also that the safety of operating a motor vehicle is substantially increased, since upon a cracking of the light-transmissive shield parts of the motor vehicle headlight having a life-threateningly high voltage thereon normally become accessible. Upon detection of a crack, or break, in the light-transmissive shield (by means of the heating element H breaking) the main connecting device, or power supply unit, of the high pressure gas discharge lamp will be switched to provide no further current.

Because the switching-on apparatus and the analyzing apparatus are part of the main connecting device, or power supply unit, of the high pressure gas discharge lamp, the benefit results in that the circuit arrangement is particularly uncomplicated and cost effective.

It is beneficial that the switching-on apparatus includes a switching device which controls the heating element cyclically, or periodically, because in this particularly uncomplicated and cost effective manner a control or regulation of a current fed to the heating element is made possible.

In that the voltage production apparatus is a series transformer, or converter, of the main connecting device, or power supply unit, of the high pressure gas discharge lamp, the benefit of having a particularly uncomplicated and cost effective embodiment of the circuit arrangement results.

It is beneficial that the series transformer or converter includes a voltage increasing circuit which increases the energizing voltage of the heating elements upon start up of the high pressure gas discharge lamp and for a time after start up. This provides the benefit that upon start up of the high pressure gas discharge lamp an existing coating or ice on the light-transmissive shield is removed as quickly as possible without the use of a large costly circuit.

Because the switching-on apparatus is connected with a temperature measuring device, the benefit results that the heating element is economically energized only when temperature conditions exist during which coating or ice build-up is possible.

Because the heating element is formed as at least one heating coil, or heating spiral, a particularly uncomplicated and cost effective control and arrangement of the heating element results.

The same benefits result if the heating element is formed as a conductive, light-transmissive, layer, or coating, on the light-transmissive shield.

While the invention has been particularly shown and described with reference to a preferred embodiment, it will be understood by those skilled in the art that various changes in form and detail may be made therein without departing from the spirit and scope of the invention.

The embodiments of the invention in which an exclusive property or privilege are claimed or defined as follows:

We claim:

1. A circuit arrangement for a motor vehicle headlight of a type including a reflector and/or a lens, a light source coupled to a voltage-source device, an enclosing light-transmissive shield, at least one electrically conducting heating element on or in the light-transmissive shield, a switching-on apparatus for the heating element;

wherein, the heating element is electrically coupled with an analyzing apparatus, the analyzing apparatus includes a light-transmissive-shield-crack monitoring means for detecting cracks in the light-transmissive shield which comprises a current or voltage measuring device, the light source is a high pressure gas discharge lamp, the voltage-source device being a power supply of the high pressure gas discharge lamp, and the switching-on apparatus and the analyzing apparatus are parts of the power supply of the high pressure gas discharge lamp for controlling power provided by the power supply to the conducting heating element and the high pressure gas discharge lamp in response to measurements of the light-transmissive shield-crack monitoring means.

2. In a circuit arrangement according to claim 1 wherein the switching-on apparatus includes a switching device which periodically controls the heating element.

3. In a circuit arrangement according to claim 2 wherein the voltage source apparatus is a series converter of the main power supply of the high pressure gas discharge lamp.

4. In a circuit arrangement according to claim 3 wherein the series converter includes a voltage-increasing means for increasing the voltage provided to the heating element upon start-up of the high pressure gas discharge lamp and for a time after start-up.

5. In a circuit arrangement according to claim 1 wherein the switching-on apparatus includes a temperature measuring means for measuring temperature and controlling the switching-on apparatus as a function thereof.

6. In a circuit arrangement as in claim 1 wherein the heating element is formed as at least one heating coil or heating spiral.

7. In a circuit arrangement according to claim 1 wherein the heating element is formed as a conductive, light-transmissive layer on the light-transmissive shield.

8. In a circuit arrangement as in claim 1 wherein the light-transmissive shield is a diffuser.

* * * * *